United States Patent [19]

Buttolph, III

[11] Patent Number: 4,540,875
[45] Date of Patent: Sep. 10, 1985

[54] ELECTRIC STORAGE HEATER SYSTEM HAVING CHARGING CONTROL THAT TRANSMITS CHARGING INFORMATION OVER POWER LINES

[75] Inventor: John L. Buttolph, III, Essex Junction, Vt.

[73] Assignee: Silver Lake Corporation, Essex Junction, Vt.

[21] Appl. No.: 635,305

[22] Filed: Jul. 27, 1984

Related U.S. Application Data

[63] Continuation of Ser. No. 374,900, May 4, 1982, abandoned.

[51] Int. Cl.$^3$ .............................................. H05B 1/02
[52] U.S. Cl. .................................... 219/364; 219/486; 219/492; 219/378; 219/519; 340/310 A; 340/310 R
[58] Field of Search ............... 219/378, 364, 483, 486, 219/492, 519, 365, 325; 340/310 R, 310 A; 236/46 R, 46 F

[56] References Cited

U.S. PATENT DOCUMENTS

| | | | |
|---|---|---|---|
| 4,117,307 | 9/1978 | Iverson et al. | 219/375 |
| 4,136,319 | 1/1979 | Bourde | 340/310 R |
| 4,169,259 | 9/1979 | Hidler et al. | 340/310 R |
| 4,194,178 | 3/1980 | Dumbeck | 340/310 R |
| 4,305,005 | 12/1981 | McKenney et al. | 219/486 |
| 4,348,582 | 9/1982 | Budek | 219/483 |
| 4,386,436 | 5/1983 | Kocher et al. | 340/310 A |

FOREIGN PATENT DOCUMENTS 2338620 7/1974 Fed. Rep. of Germany ... 340/310 A

Primary Examiner—M. H. Paschall
Attorney, Agent, or Firm—Wolf, Greenfield & Sacks

[57] ABSTRACT

Apparatus which can control a remotely-located electric storage heater from a central location without requiring control wires between the central location and the remote location is disclosed. Control signals indicating the heating cycle and representative of the outside ambient temperature are generated by apparatus at the central location and encoded by high-frequency signals which are superimposed on the normal power line voltage. At remote locations each electric storage heater is equipped with a receiver unit which decodes the high frequency control signals superimposed on the power line. The receiver unit then operates a solid state relay to convert the coded signals into the normal control signals which operate the heater.

8 Claims, 3 Drawing Figures

ELECTRIC STORAGE HEATER SYSTEM HAVING CHARGING CONTROL THAT TRANSMITS CHARGING INFORMATION OVER POWER LINES

This application is a continuation of application Ser. No. 374,900, filed May 4, 1982 now abandoned.

FIELD OF THE INVENTION

This invention relates to electric space heating and in particular to electronic controls for controlling electric storage space heaters.

BACKGROUND OF THE INVENTION

There are, at present, several different arrangements for electric space heating of residential and industrial environments. One widely-used electrical space heating method is direct resistance heating. In this type of system, heat is generated by running electric current through an electrical circuit which includes resistive wire coils. The electrical heating circuit is controlled by means of a thermostat which operates the heating coils in response to the demands of the heated environment.

Although simple in construction and operation, direct resistance heating has several associated drawbacks. One such drawback is that is places heavy demands on the electric power source. This problem occurs because the demand for both residential and industrial space heating is usually highest during the peak period of industrial demand. Therefore, power companies providing both industrial and residential heating power must provide for high peak capacities during the normal daytime hours. One direct result is that the total cost of producing the electricity is increased and, in particular, electrical use rates are highest during the space heating period causing the direct resistance heating system to be relatively expensive to operate.

In order to solve this problem and to provide a more balanced load for power and utility companies, electric storage heating is commonly used in many countries. In this type of heating heat is not provided directly to the heated environment from electrical resistance elements but instead resistive elements are used to heat a "storage" medium which usually consists of thermal brick or other material with a high heat capacity. The storage material is heated or "charged" during a time when electrical demands are low, usually at night. During the peak space heating hours (usually during the day when electrical demands are high) charging of the storage medium is discontinued and the heat is removed or "discharged" from the heat storage medium by circulating air over the storage medium with a fan. Such an arrangement allows electrical space heating to be performed at off-peak electrical rates, therefore, it is less expensive to operate. In addition, due to a reduced peak load on the utilities the electrical rate offered by the utilities is often considerably lower.

For multi-room residences and industrial applications, an electrical storage space heating system is usually designed with a set of remotely located heating units which are controlled from a central location in order to coordinate the operation of the heaters. With this arrangement, circuitry at the central location can economically control the charging time for the remote units. In addition, more sophisticated circuitry can be added which controls the charging of the remote heaters in relation to the outside ambient temperature. This latter arrangement allows the heating units to be operated with increased efficiency.

While electric storage heating has been an attractive alternative in new construction, it has found limited use for retrofitting of heating systems in existing buildings. This problem is due to the prior art control circuitry used to control the remote storage units from the central location. Typically, control signals generated at the central location are provided to the remote heaters by hard-wired control cables between the central control device and the remote storage units. Since such cables are not present in existing buildings with direct resistance heating, it has been considered uneconomical to rewire the buildings for electrical storage heating.

Therefore, it is an object of the present invention to provide an electrical heating control arrangement which allows a storage heating system to be easily retrofitted into existing buildings with direct electrical heating.

It is another object of the invention to provide an electrical storage heating control which is also economical when used in new construction.

It is a further object of the invention to eliminate the requirement for hard-wired control cables between the central location and the remote space heaters.

It is yet a further object of the invention to provide an electric storage space heater control which would allow a central control to control an unlimited number of electric storage heaters.

It is still another object of the invention to eliminate maintenance problems associated with hard-wired cable runs between the central location and remote space heaters.

It is yet another object of the invention to avoid switching high current heating element power at the central location.

It is a further object of the invention to provide an electric space heater control in which all heater control voltages originate at the remote location.

SUMMARY OF THE INVENTION

The foregoing objects are achieved and the foregoing problems are solved in one illustrative embodiment of the invention in which control information regarding the charging time and the outside temperature are transmitted from a central location to a plurality of remote storage heater locations by means of high-frequency control signals that are superimposed upon the normal electric power lines connecting the two locations. In particular, control information generated by time-clock switches and outside temperature sensors at the central location are converted into digital signals by means of electronic relays. Apparatus is provided which encodes the digital signals into high-frequency signal codes and superimposes the latter onto the normal A.C. votages present in the power line. At each remote heater location, the superimposed high-frequency signals are received by a receiver unit which converts them back to digital signals. Finally, electronic relays convert the digital signals into control contact closures which are capable of operating standard heating units. Accordingly, the central location and the remote location need only be connected by a normal power line connection. Since such is always the case with presently existing direct resistance heating arrangements, the system can be easily retrofitted to existing systems.

DETAILED DESCRIPTION OF THE INVENTION

Figure 1:
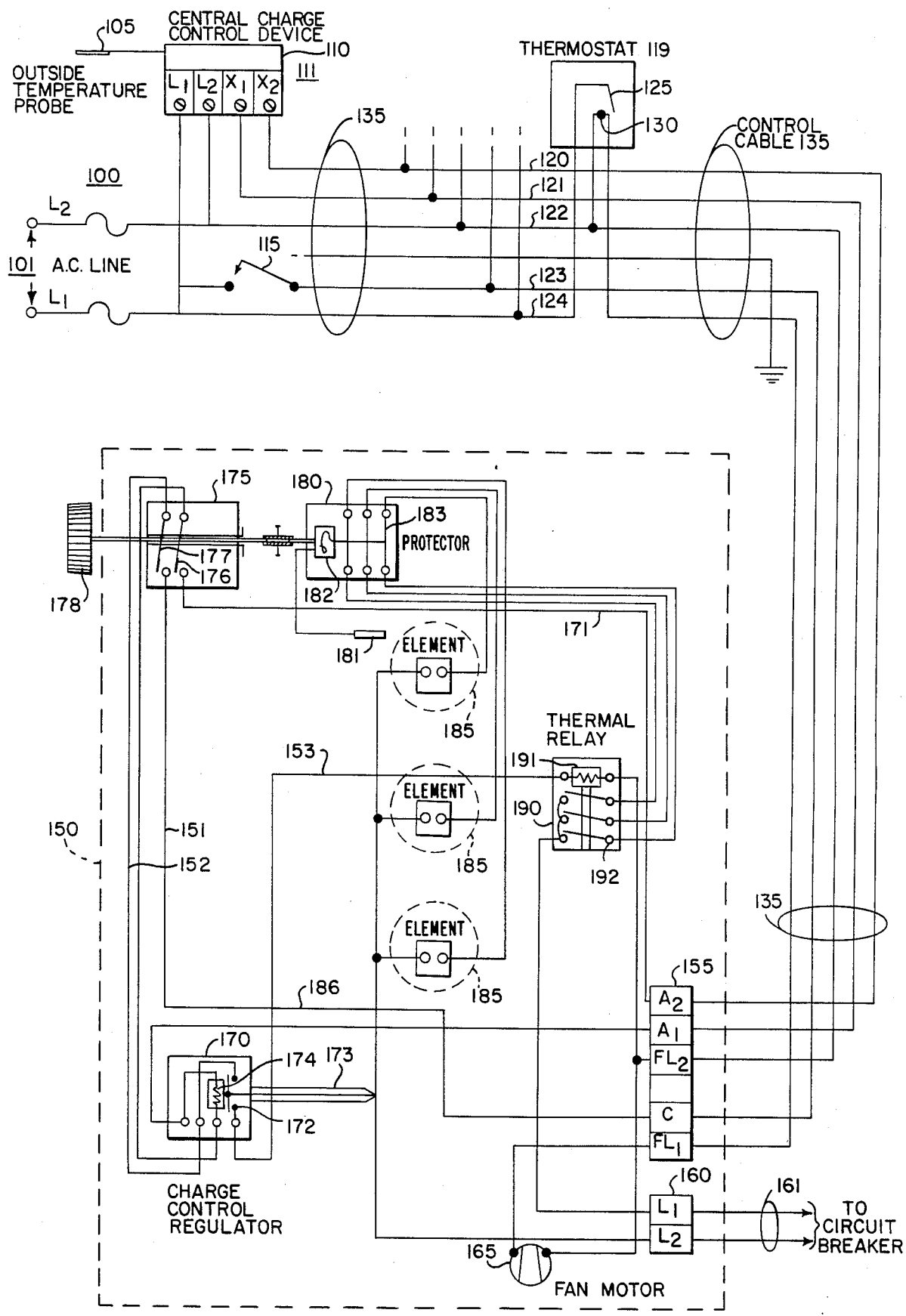
FIG. 1 of the drawing is an electrical schematic diagram of the control circuit for a prior art storage heating system.

FIG. 1 shows a typical electrical storage heating arrangement which is useful for multi-location residential or industrial applications. Most storage heating units operate on the same principles and, advantageously, the invention is suitable for use with most such units. The system has a central location 100 at which is located the charging control circuitry for controlling charging of the remote heater units. A plurality of storage heating units can be connected to location 100 and located remotely in the environmental areas to be heated (only unit 150 is shown for clarity, the other units are identical). The operation and installation of electrical storage heating units is well-known in the art and will not be described in detail herein. A storage heating unit which is suitable for use with the illustrative embodiment is a Model No. WSP206 electric storage heater sold by the Control Electric Corporation, 346 Shelburne Road, Burlington, Vt. Many other standard heater units may also be used with the invention.

As previously described, apparatus is provided at the central location which generates signals that control the charging of the heating units. In particular, charging is controlled by the combined operation of charge control unit 110 and time switch 115. Unit 110 contains well-known circuitry which senses the outside ambient temperature via probe 105 and generates control signals having a duty-cycle proportional to the sensed temperature. In particular, device 110 is connected by terminal strip 111 (having four terminals $L_1$, $L_2$, $Z_1$, $Z_2$) to an A.C. power line (conductors $L_1$ and $L_2$) and to control cable 135. The A.C. voltage appearing at $L_1$ and $L_2$ of terminal strip 111 is modulated in a well-known manner by device 110 in response to the temperature sensed by probe 105 to provide an output signal on terminals $Z_1$ and $Z_2$. More specifically, the duty cycle of the signal appearing at terminals $Z_1$ and $Z_2$ varies in proportion to the outside temperature—as the outside temperature increases, the duty cycle of the output signal increases until, at a predetermined temperature, a nearly constant signal is produced at $Z_1$ and $Z_2$. Conversely, as the outside temperature decreases the duty cycle at the signal at terminals $Z_1$ and $Z_2$ also decreases until, at a preset temperature, no signal appears at output $Z_1$ and $Z_2$. A charge control unit suitable for use with the illustrative embodiment is an Elfamatic automatic charge control sold by the Control Electric Corporation, 346 Shelburne Road, Burlington, Vt.

At the central location there is also provided a limiting switch 115. This switch is normally controlled by either a time clock (not shown) or other well-known apparatus provided by the electric power company (not shown) so that it is closed only during those time periods in which the electric rate is lowest (during "off-peak" rates). When the switch is closed charging of the storage heaters takes place. When the switch is open no charging occurs.

In typical prior art devices, control power on power lines $L_1$ and $L_2$ and control signals on terminals $Z_1$ and $Z_2$ of unit 10 are provided, via a six-wire control cable 135, (consisting of conductors 120-124 and ground) to each remote location where an electric storage heating device is located.

At the remote location control cable 135, carrying the control signals, is first routed to a thermostat 119 which controls the discharge of heating unit 150 and, accordingly, the temperature of the associated area. From the thermostat, control cable 135 is routed to heater unit 150 where it is connected to terminal strip 155. Although A.C. electric power is available through cable 135, to avoid carrying the high currents necessary to operate the electrical heating elements, storage heating unit 150 is normally connected directly to a source of electrical power available from a central circuit breaker by means of cable 161 and terminals 160.

Storage heating unit 150 is a well-known device shown schematically which consists of four electrical control devices 170, 175, 180 and 190 and a plurality of electrical heating elements 185. A storage medium (not shown) is also provided with each heater. The control signals present at terminal strip 155 operate the control devices within heater 150 which devices, in turn, control the heating (charging) and cooling (discharging) of elements 185 and the associated storage medium.

In particular, heating elements 185 are connected in parallel and the entire set of elements is connected in series with terminals 160 and control devices 180 and 190. Specifically, one terminal of elements 185 is connected directly to the A.C. power line by means of terminal $L_2$ of terminals 160. The other terminals of elements 185 are connected to protector device 180 and from there, via thermal relay 190, to the other side of the A.C. power line via terminal $L_1$ of strip 160.

Protector device 180 operates either when the associated heater overheats due to malfunction or when the device is manually adjusted by the user by means of adjustment knob 178 (mechanically connected to device 180 and schematically shown). Protector device 180 contains a fluid pressure transducer 182 which monitors the temperature of the heating elements by means of capillary bulb 181. If the temperature of the elements exceeds a predetermined limit, fluid pressure developed by capilliary bulb 181 acts on transponder 182 and causes circuit breaker 183 to become open breaking the electrical circuit to prevent overheating.

During normal operation of heater 150, the heating and cooling of elements 185 is controlled by means of thermal relay 190. Thermal relay 190 contains a resistance element 191 and a plurality of switches 192. Control current running through resistance element 191 heats element 191 which mechanically closes switch elements 192 and connects heating elements 185 across the power line.

The control current for element 191 is, in turn, controlled by the two remaining control devices—charge control 175 and charge control regulator 170, which devices operate thermal relay 190 in accordance with signals received from central control 100 over control cable 135. In particular, charge control 175 is mechanically coupled to circuit breaker 183 in protector 180 and can be manually operated by the user via adjustment knob 178. Device 175 is arranged so that, normally, during a charging operation contacts 176 and 177 remain closed. Contact 177 opens only when the adjustment knob 178 is manually set to a "zero" position by the user. Under this condition, control current for element 191 of thermal relay 190 is shut off and the heater cannot charge under any circumstances. Contact 176 is normally always closed, but may be manually opened by trained heater service personnel if heater is to used without automatic charge control signals (the signals produced by central charge control device 110.)

Specifically, assume contacts 176 and 177 are closed. During a charging operation, as previously described, contacts 115 in the central location are closed and current flows from line $L_2$ of the A.C. line 101, via conductor 123, in cable 135, to terminal C of terminal strip 155 in heater 150. From there current flows via lead 151, closed contact 177 and lead 152 to charge control regulator 170. In the charge control regulator this current is routed, via internal connections, through switch 172 to lead 153. From there the current flows to the heating device 191 of thermal relay 190. As previously described this current will, after a specified period of time close contacts 192 connecting heating elements 185 across the power line 161 to begin charging of the unit.

Charge control regulator 170 is directly controlled by the central control circuitry to charge the storage medium in accordance with the outside ambient temperature. The control signals produced at outputs $Z_1$ and $Z_2$ of the central control 100 are applied to terminals $A_1$ and $A_2$ of strip 155 via leads 120 and 121 of control cable 135. The output current produced by the control device 110 flows, via terminal $A_2$, lead 171, and contact 176 to the resistive heater 174 in charge control regulator 170. After passing through heater 174, the current passes, via lead 186, and terminal $A_1$ back to the central control.

The heat generated by heater 174 acts upon switch 172 so that switch 172 tends to open with increasing heat. Since heater 174 is heated by the output current of the central control device, as the duty cycle of the control output increases, the temperature of device 174 will also increase causing switch 172 to open. When switch 172 opens it interrupts the current flow operating relay 190 and causes it to disconnect heating elements 185. In particular, a continuous signal applied to terminals $A_1$ and $A_2$ and heater 174 will keep switch 172 open and prevent the heater from charging.

In addition to being controlled by heater 174, charge control regulator 170 is also arranged so that switch 172 is under control of a mechanical expansion bar 173 which senses the temperature of the heat storage medium. Therefore, as the temperature of the storage medium increases, probe 173 will also tend to open switch 172 disconnecting the heating elements. Consequently, the amount of charge given to the storage medium depends on the duty cycle of the signal produced by the central control device and the temperature of the storage medium.

Cooling or discharge of the storage medium occurs when fan motor 165 circulates air over the heated storage medium. Fan motor 165 is operated by power received via terminals $FL_1$ and $FL_2$ of terminal strip 155 which is controlled by thermostat 119. Thermostat 119 contains a contact 125 and a small resistance "heat anticipator" element 130 well-known to those skilled in the art. In particular, when the "set point temperature" of thermostat 119 is reached, contact 125 closes applying power from line $L_1$, via lead 124 and thermostat 119, to fan motor 165 causing the fan to operate and blow air across the heating elements 185.

Figure 2:
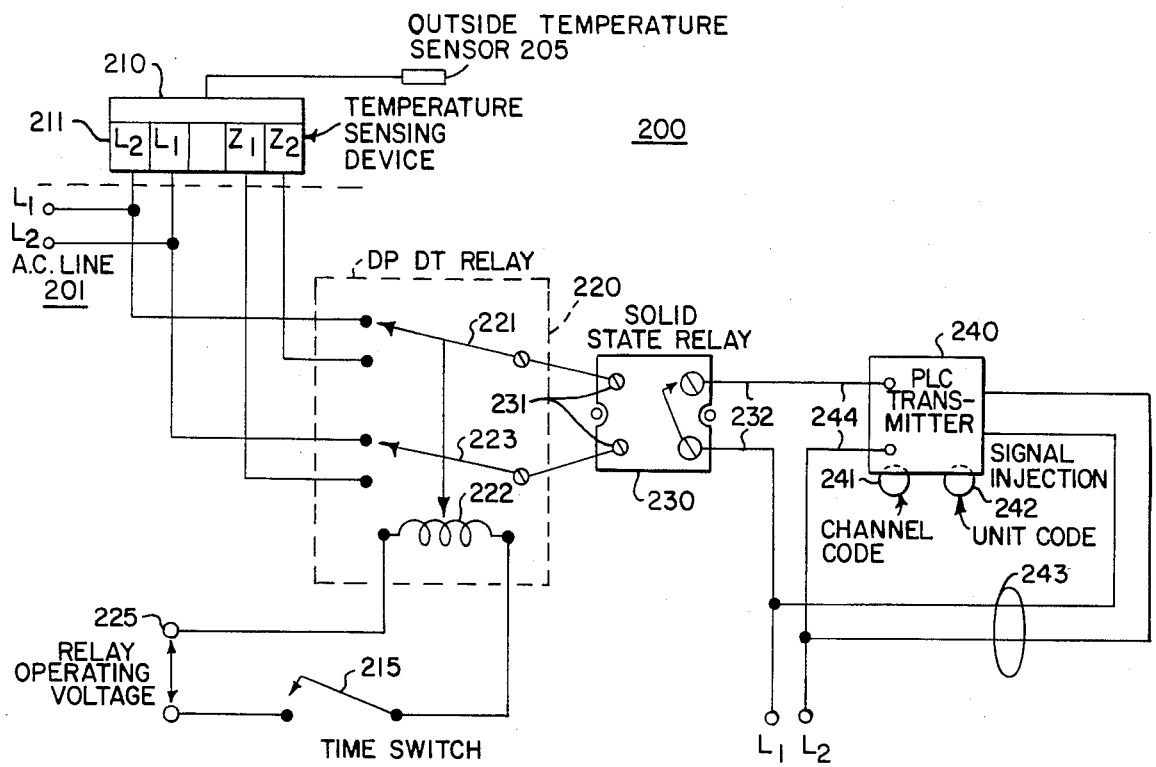
FIG. 2 of the drawing is an electrical schematic diagram of a control circuit for a storage heating system utilizing the encoding circuitry of the present invention to forward control signals from the central location to the remote storage heaters.

FIG. 2 of the drawing shows an illustrative embodiment of the invention in which, advantageously, according to the invention, the control cable previously necessary between the central location and the remote heater has been eliminated by means of electronic encoding circuitry. In particular, according to the principles of the invention, the encoding circuitry is arranged to operate with conventional storage heaters without any internal modifications in the heater circuitry.

The invention code transmission circuitry consists of a transponder or transmitting device at central location 200, and a corresponding receiver device at the remote location 250. The transponder apparatus at location 200 comprises electro-mechanical relay 220, solid state relay 230 and power line transmitter unit 240. These three devices encode the signals produced by the central charge control for transmission over the normal power lines to remote location 250.

In particular, as previously described, conductors $L_1$ and $L_2$ of the A.C. power line 201 are provided, via terminal strip 211, to charge control device 210. As previously described, in accordance with the temperature sensed by the outside temperature sensor 205, device 210 places a control signal on outputs $Z_1$ and $Z_2$ whose duty cycles vary with proportion of the outside temperature. Outputs $Z_1$ and $Z_2$ are provided to the lower contacts of a double-pole, double-throw relay 220. The upper contacts are connected to the A.C. line conductors $L_1$ and $L_2$.

Relay 220 is a "break before make" relay which operates under control of the signal on coil 222. Coil 222 is in turn connected by means of the time switch 215 to a source of operating voltage 225. Therefore, when time switch 215 is open (signifying a "no charge" condition) relay 220 is released and, via its moveable contacts 221 and 223, applies a constant voltage from A.C. line 201 to the input terminals 231 of solid state relay 230. On the other hand, when switch 215 is closed (signifying a charge condition) relay 220 operates from source 225 and applies the varying signal from outputs $Z_1$ and $Z_2$ to the input terminals 231 of solid state relay 230.

Solid state relay 230 is a well-known electronic device which functions in an equivalent manner to an electro-mechanical single-pole, single-throw relay with the exception that it contains no mechanical parts. The relay therefore has the advantage that it is noiseless, maintenance-free, very fast acting and capable of virtually unlimited number of cycles of operation. The operation and design of such relays is well-known and a relay suitable for use with the illustrative embodiment is a Model No. W6202ASX-1 manufactured by the Magnecraft Corporation, 5575 N. Lynch Avenue, Chicago, Ill.

Responsive to a control voltage appearing at its input terminals 231, relay 230 closes an internal circuit placing an electrical short circuit across its output terminals 232. The short across the output terminal 232 of relay 230 allows A.C. line voltage on lines $L_1$ and $L_2$ to be applied to the input terminals 244 of power line carrier unit 240. Carrier unit 240 is also a well-known electronic unit which in response to an A.C. voltage appearing at its input terminals 244 generates a coded signal of a predetermined frequency. The coded signal has a frequency which is high enough so that the signal does not interfere with normal operation of equipment powered by the A.C. line but the signal can be received and decoded by a corresponding power line carrier receiver unit.

Unit 240 preferably has two dials which allow the signal frequency and code to be changed. In particular, unit 240 may have a channel code switch 241 which allows a particular encoding frequency to be selected and a unit code switch 242 which allows a predetermined code to be generated using the selected channel frequency. The design and construction of such power line carrier units is well-known and a device suitable for use with the illustrative embodiment is a Model T8C-120, manufactured by Southwood Electronics, Inc., Box 673, Greenwood, Ind. (A transformer may be necessary to make voltage levels compatible). The coded signals produced by device 240 are applied to signal injection leads 243 which are connected across power line conductors $L_1$ and $L_2$.

In accordance with the invention, coded signals are only produced by device 240 when a voltage is applied to its input terminals 244. Therefore, the coded signals produced by device 240 are governed by the position of relay 220. When relay 220 is released, a continuous signal appears at the input of transmitter unit 240 which, accordingly, produces a continous signal on its output 243. Alternatively, when relay 220 is operated, the varying signals from the output of control device 210 are encoded by device 240 and provided to remote location 250.

Figure 3:
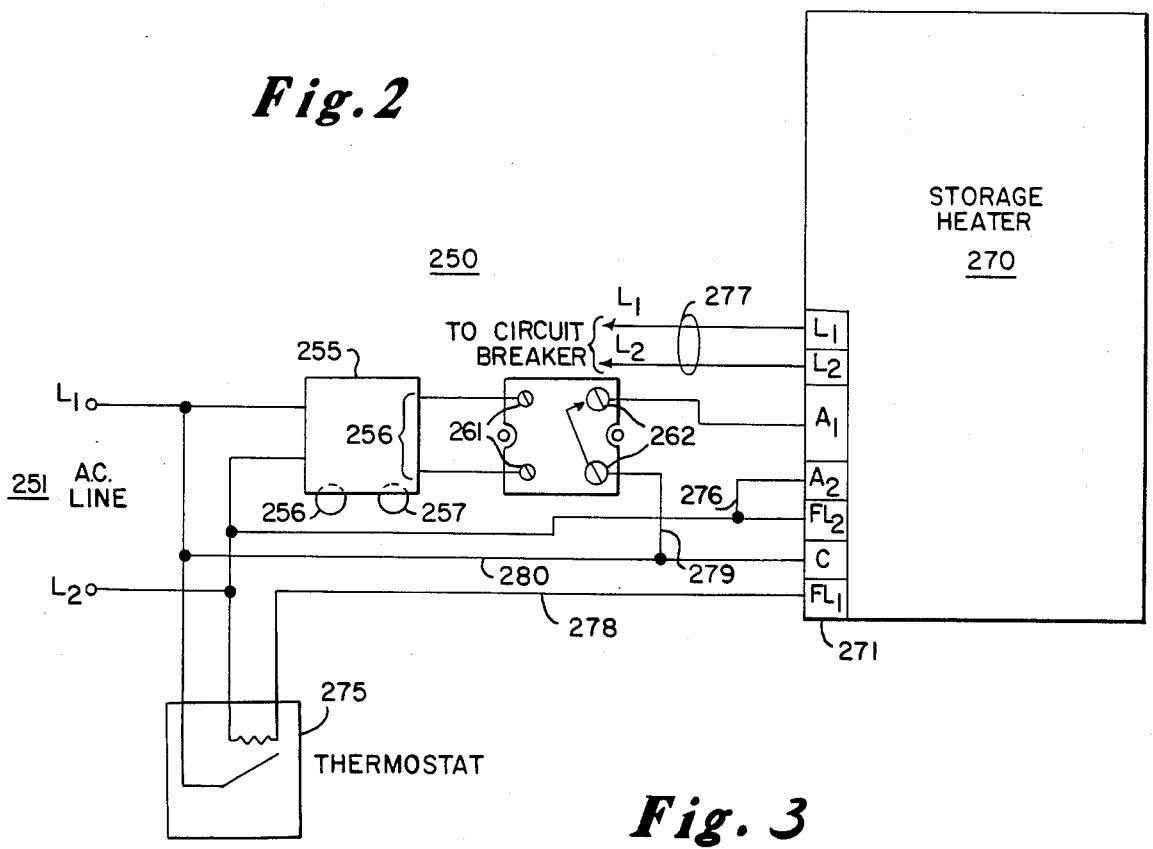
FIG. 3 of the drawing is an electrical schematic diagram of the receiver circuitry of the present invention located at the remote storage heater location.

The signal produced by transmitter 240 is received in the remote location 250 over the normal power lines connecting the two locations. In particular, as shown in FIG. 3, at remote location 250 a storage heater, 270, whose internal construction and wiring is equivalent to heater 150 shown in FIG. 1 is located. Heater 270 is connected by means of terminal strip 271 to the receiver control circuitry consisting of power line carrier receiver 255, solid state relay 260 and thermostat 275.

Thermostat 275 functions in an equivalent manner as previously described to control a heater fan which discharges the stored heat. Heater 270, however, is charged in accordance with the signals received over power line 251 and decoded by means of receiver unit 255. In particular, receiver unit 255 is a well-known electronic device which responds to the coded signals generated by transmitting device 240. A device suitable for use with the illustrative embodiment is a Model R8-120, manufactured by Southwood Electronics, Inc., Box 673, Greenwood, Ind. (A transformer may be necessary to make voltage levels compatible). The channel code and unit code of receiver 255 are set to the corresponding channel by means of switches 256 and 257, respectively.

In response to a properly coded signal received at its inputs, unit 255 produces an output voltage at its output 256. In particular, assuming as previously described, transmitter unit 240 produces a continous signal, unit 255 will produce a continuous signal at its output. This signal is provided to the input terminal 261 of solid state relay 260 which in the illustrative embodiment may be equivalent to relay 230.

In response to the continous signal provided to its inputs relay 262 closes an internal contact providing an electrical short circuit across output terminals 262. With the output terminals of relay 262 shorted, current flows via line $L_1$, lead 280, lead 279, the output terminals of relay 260 to terminal $A_1$ of heater 270. Terminal $A_2$ of heater unit 270 is connected, via lead 276, directly to the $L_2$ conductor of A.C. line 251 instead of the output of the central control unit. As previously described, if a continous current is provided to terminals $A_1$ and $A_2$, heater 270 will not charge even though the current flows via terminal C of terminal strip 271 into the heater (terminal C is connected via lead 280 directly to line $L_1$ of A.C. line 251 instead of the central location).

Assume now at the central location 200 time switch 215 closes indicating that the storage heaters are to begin charging. In this case, as previously described, relay 220 will become actuated and connect the output voltage produced on terminals $Z_1$ and $Z_2$ of device 210 to the input terminals 231 of relay 230. Relay 230 in response thereto opens and closes its contact in accordance with the duty cycle of the output signal produced by device 210. Therefore, the voltage appearing across $L_1$ and $L_2$ is provided to the input of transmitter unit 240 in accordance with the duty cycle produced by device 210 and device 240 thereupon applies a coded signal with a duty cycle determined by device 210. This coded signal is received by receiving unit 255 at the remote location and operates relay 260 in accordance therewith. Therefore, a time varying signal with a duty cycle detemined by device 210 is applied to terminals $A_1$ and $A_2$ of heater unit 270. Unit 270 accordingly operates, as previously described, to charge to a predetermined limit.

Although one illustrative embodiment of the invention has been described, other modifications within the spirit and scope of the invention will become obvious to those skilled in the art. For example, time switch 215 may be replaced with a demand limiter switch or other method for controlling the storage heating units. In addition, transmitting unit 240 and receiving unit 255 may be modified in order to send out a first predetermined code to signal the start of charging and a second predetermined code to signal the end of charging rather than the continuous duty cycle signal which is contemplated in the illustrative embodiment.

What is claimed is:

1. An electric storage heating system comprising,
   charge control circuitry for generating two control signals including a first control signal, said first control signal being a continuous periodic signal with a first value and a second value and and having a duty cycle related to outside ambient temperature and a second control signal related to electrical power rates on an associated power line, said second control signal having a first value when said electrical power rates on said power line are below a predetermined value, the time duration of said first control signal defining a heater charging time interval, and having a second value when said electrical power rates on said power line are above a predetermined rate, the time duration of said second control signal defining a non-charging time interval,
   at least one electric storage heating unit located remotely from said charge control circuitry and having a storage medium therein and means for charging said storage medium from said power line,
   a power line carrier signal generator operable for continuously generating an analog A.C. signal using the alternating current signal on said power line for a carrier and encoding thereon said analog A.C. signal with a frequency substantially higher than the frequency of said power line alternating current signal, a first relay responsive to said first value of said second control signal for applying said first control signal to said power line carrier signal generator to cause said generator to generate a periodic data signal for the entire duration of said heater charging time interval, said periodic data signal consisting of periodic bursts of said analog A.C. signal alternating with periods of no signal, said first relay being responsive to said second value of said second control signal for applying a constant signal to said power line carrier signal generator to cause said generator to produce a steady data signal consisting of a continuous analog A.C. signal for the entire duration of said non-charging time interval, a power line carrier signal receiver located at said one remote storage heating unit location, said receiver being connected to said power line and being responsive to said data signal on said power line for decoding said signal to produce an operating voltage, and a second relay responsive to said operating voltage for controlling the charging of said heating unit.

2. Control apparatus for an electric storage heating system according to claim 1 wherein said first relay is a solid-state relay.

3. Control apparatus for an electric storage heating system according to claim 2 wherein said second relay is a solid-state relay.

4. An electric storage heating system according to claim 1 wherein said second relay is responsive to the periods of no signal in said periodic data signal for charging said heating unit and said second relay is responsive to said continuous data signal for stopping the charging of said heating unit.

5. An electric storage heating system comprising, charge control circuitry comprising means for defining a heater charging time interval and a non-charging time interval, and means for continuously generating a charging signal during said heater charging interval, said charging signal being a periodic signal having a first and a second value and a duty cycle related to outside ambient temperature, at least one electric storage heating unit located remotely from said charge control circuitry and having a storage medium therein and means for charging said storage medium from an associated power line, said power line carrying alternating current at a predetermined frequency, a power line carrier unit comprising signal generator means responsive to said first value of said charging signal for generating an analog A.C. signal with a frequency substantially higher than said power line alternating current frequency and being responsive to said second value of said charging signal for generating no signal, so that in response to said charging signal said signal generator means generates a periodic data signal for the entire duration of said charging time interval, said periodic data signal consisting of periodic bursts of analog A.C. signal, and means for superimposing said periodic data signal on said alternating current power line signal, receiver means located at said one remote storage heating unit location, said receiver unit connected to said power line and being responsive to said periodic data signal on said power line for decoding said periodic data signal to control the charging of said heating unit.

6. An electric storage heating system according to claim 5 wherein said heater charging time interval defining means comprises means responsive to the electrical power rates on said power line for generating a first control signal defining a charging time interval when said rates are below a predetermined value and for defining a non-charging time interval when said rates are above said predetermined value.

7. An electric storage heating system according to claim 5 wherein said receiver means comprises a receiver unit for decoding said periodic data signal and for generating a control signal during the times when no analog A.C. signal is received and means responsive to said control signal for charging said heating unit.

8. An electric storage heating system according to claim 5 further comprising means for generating a no-charge signal during said non-charging time interval, said signal generator being responsive to said no-charge signal for generating a continuous analog A.C. signal.

* * * * *